United States Patent [19]

Sugi et al.

[11] Patent Number: 5,544,533

[45] Date of Patent: Aug. 13, 1996

[54] AREA FLOW METER WITH HALL DEVICES HAVING MAGNETISM-RESPONSIVE SURFACES

[75] Inventors: Tokio Sugi, Tokyo; Fumiya Furuno, Yokohama, both of Japan

[73] Assignee: Tokyo Keiso Kabushiki-kaisha, Tokyo, Japan

[21] Appl. No.: 356,838

[22] Filed: Dec. 15, 1994

[30] Foreign Application Priority Data

Dec. 29, 1993 [JP] Japan .................................... 5-351162

[51] Int. Cl.$^6$ ................................................ G01R 33/025
[52] U.S. Cl. ..................................... 73/861.56; 73/861.58
[58] Field of Search ........................... 73/861.53, 861.56, 73/861.08, 861.58, 861.66, 277

[56] References Cited

U.S. PATENT DOCUMENTS

| | | | |
|---|---|---|---|
| 3,522,731 | 8/1970 | Wilson | 73/861.56 |
| 5,186,058 | 2/1993 | Lew | 73/861.56 |
| 5,187,988 | 2/1993 | Dettmer et al. | 73/861.53 |
| 5,327,789 | 7/1994 | Nijdam | 73/861.53 |

FOREIGN PATENT DOCUMENTS 406026900  2/1994  Japan .................................. 73/861.56

*Primary Examiner*—Richard Chilcot
*Assistant Examiner*—Max Noori
*Attorney, Agent, or Firm*—Frishauf, Holtz, Goodman, Langer & Chick

[57] ABSTRACT

In an area flow meter, float 22 made of material larger in specific gravity than a fluid being measured is movably disposed in vertical pipe 21. Magnet 23 in the float 22 has its north and south poles aligned vertically to produce magnetic-force lines 26 symmetrically with respect to its symmetry axis. Magnetism-gathering tapered element 27 made of a high-permeability material is configured to flare outwardly from its fixed end to its free end to have their fixed ends mounted on magnetism-responsive surfaces of magnetic sensors "A" which are at the same distance from the symmetry axis and disposed outside the pipe on a plane perpendicular to the axis. The flux caught by the elements 27 is gathered on the surfaces to boost only output sensitivity required for detection of the float in position.

3 Claims, 5 Drawing Sheets

TERMINALS

TERMINALS

AREA FLOW METER WITH HALL DEVICES HAVING MAGNETISM-RESPONSIVE SURFACES

BACKGROUND OF THE INVENTION

1. Field of the Invention

The present invention relates to an area flow meter for measuring a flow rate of a fluid passing through a flow passage pipe on the basis of a position of a float movably mounted inside the flow passage pipe.

2. Description of the Prior Art

A so-called area flow meter is widely used, in which a movable element or float is larger in specific gravity than a fluid being measured. The float is disposed inside a vertical flow passage pipe of the flow meter so as to be movable up and down therein. As the float moves upward, the flow passage pipe has its effective cross-sectional area gradually increased. A flow rate of a fluid passing through the flow passage pipe upward is determined on the basis of the position of the float. Some of the area flow meters have their flow passage pipes constructed of opaque members. In this opaque type of area flow meter, some detection means which is disposed outside the flow passage pipe so as to detect the position or height of the float outside the pipe is required. It is necessary for such detection means to convert a value of the position or height of the float into an electrical signal.

There are various types of the detection means for converting the value of the height of the float into the electrical signal. As shown in FIG. 8 (Prior Art), the applicant's company has developed one of these conventional detection means for determining the height of the float, in which one: a magnet M is fixedly mounted in a float F; and, a pair of magnetic sensors such as Hall devices A-1, A-2 are disposed outside the flow passage pipe so that the height of the float is determined on the basis of output signals issued from the magnetic sensors such as the Hall devices.

In the conventional detection means, the height of the float is determined on the basis of the angle of inclination of the magnetic-force line issued from the magnet mounted in the float. The conventional detection means requires no movable mechanism with the exception of the float, and, therefore is excellent in reliability and compact in construction. However, the conventional detection means is suffering from the following problems:

(1) Since the magnet is largely spaced apart from the magnetic sensors, the magnetic force of the magnet damps or weakens in the vicinities of the magnetic sensors. Consequently, in order to ensure high-accuracy measurements of the position of the float, it is necessary for the conventional detection means to have its magnetic sensors improved in sensitivity or to have its magnet improved in strength of magnetic force;

(2) In the area flow meter, there is a close relationship between dimensions/weight of the float and the measuring range of the flow meter, which limits the magnet mounted in the float in size, and, therefore in strength of magnetic force;

(3) Of the conventional magnetic sensors, ones excellent in sensitivity and stable in output are very expensive and not available for reasonable prices, which makes it difficult to use such expensive sensors in the conventional area flow meter; and (4) Some fluid to be measured by the area flow meter is high in temperature. When such high-temperature fluid is measured in flow rate, it is necessary to have the flow passage pipe or the float largely spaced apart from the magnetic sensors so as to permit the magnetic sensors to be disposed in places having moderate temperatures which ensure proper operations of the magnetic sensors. However, this arrangement of the magnetic sensors is not realistic due to poor sensitivities of the magnetic sensors.

Further, there are various types of magnetic sensors which permit their electrical variables representing physical quantities to vary in response to the magnetic flux density of the magnet. Of these types of magnetic sensors, a typical one is a so-called Hall device.

As shown in FIG. 9 (Prior Art), the Hall device is provided with four terminals, of which a pair of ones are electric-power supply terminals. When the Hall device is energized with an electric power P supplied through the electric-power supply terminals, the other pair of the terminals of the Hall device produce there between an output voltage E which corresponds to a magnetic flux density B of the magnet, which magnetic flux density B is measured in a magnetism-responsive surface of the Hall device. Consequently, it is possible to determine the magnetic flux density B of the magnet on the basis of the output voltage E of the Hall device, the magnetic flux density B appearing in the magnetism-responsive surface of the Hall device.

In the conventional detection means shown in FIG. 8 described above, the pair of the Hall devices A-1, A-2 have their magnetism-responsive surfaces crossed at right angles with each other so that the position or height of the magnet in the float is determined on the basis of output voltages issued from the Hall devices A-1, A-2. This conventional detection means is excellent in principle. However, the detection means requires the Hall devices to be excellent in output sensitivities corresponding to the magnetic flux density in order to realize high-accuracy measurements of the fluid in flow rate. As a means for improving the Hall device in output sensitivity, there is a known amplifier means for electrically boosting the output voltage of the Hall device. However, such amplifier means also boosts any other noises such as electrical noises of the Hall device itself, external electrical noises, and other electrical physical quantities forming obstacles to the measurements of the fluid in flow rate, the obstacles including the zero drift of the Hall device in the measurements. Consequently, the amplifier means is not adequate to the needs.

Further, there are various methods for catching the magnetic flux of the magnet through magnetic-permeability elements excellent in permeability. However, any of these methods is not good in application thereof.

The reason why an effective application of any one of the above methods is not realized in the prior art is that: the magnetic-permeability element excellent in permeability tends to be magnetically saturated, which prevents the magnetic flux proportionate to the magnetic flux density near the element from concentrating in the element.

SUMMARY OF THE INVENTION

It is an object of the present invention to provide an area flow meter, in which a magnetic flux having been caught concentrates in a magnetism-responsive surface of a magnetic sensor so that only an output sensitivity required for detection of the position of a magnet in a float is boosted to determine the flow rate of a fluid with high accuracy.

According to a first aspect of the present invention, the above object of the present invention is accomplished by providing:

An area flow meter comprising:

a vertical flow passage pipe through which a fluid being measured flows upward;

a float made of a material larger in specific gravity than the fluid, the float being mounted in the flow passage pipe so as to be vertically movable in the flow passage pipe an effective cross-sectional area of which varies when the float is vertically moved by the fluid;

a magnet which is mounted in the float and so magnetized as to have its north and south poles aligned vertically, whereby the magnet produces its magnetic-force lines symmetrically with respect to its vertical symmetry axis which is parallel to a direction in which the float moves; and a plurality of magnetic sensors provided with magnetism-responsive surfaces, mounted on each of which surfaces is a fixed end of a magnetism-gathering tapered element made of a high-permeability material, the tapered element being so configured as to flare outwardly from the fixed end to its free end, each of the magnetic sensors being at the same distance from the symmetry axis of the magnet and disposed outside the flow passage pipe on a plane perpendicular to the symmetry axis of the magnet.

According to a second aspect of the present invention, the above object of the present invention is accomplished by providing:

The area flow meter as set forth in the first aspect of the present invention, wherein:

each of the magnetic sensors is provided with the magnetism-responsive surface in each of its opposite sides; and the magnetism-gathering tapered element is mounted on each of the magnetism-responsive surfaces of the opposite sides of each of the magnetic sensors.

According to a third aspect of the present invention, the above object of the present invention is accomplished by providing:

The area flow meter as set forth in the first or the second aspect of the present invention, wherein:

each of the magnetic sensors is constructed of a Hall device.

DESCRIPTION OF THE PREFERRED EMBODIMENTS

Figure 1:
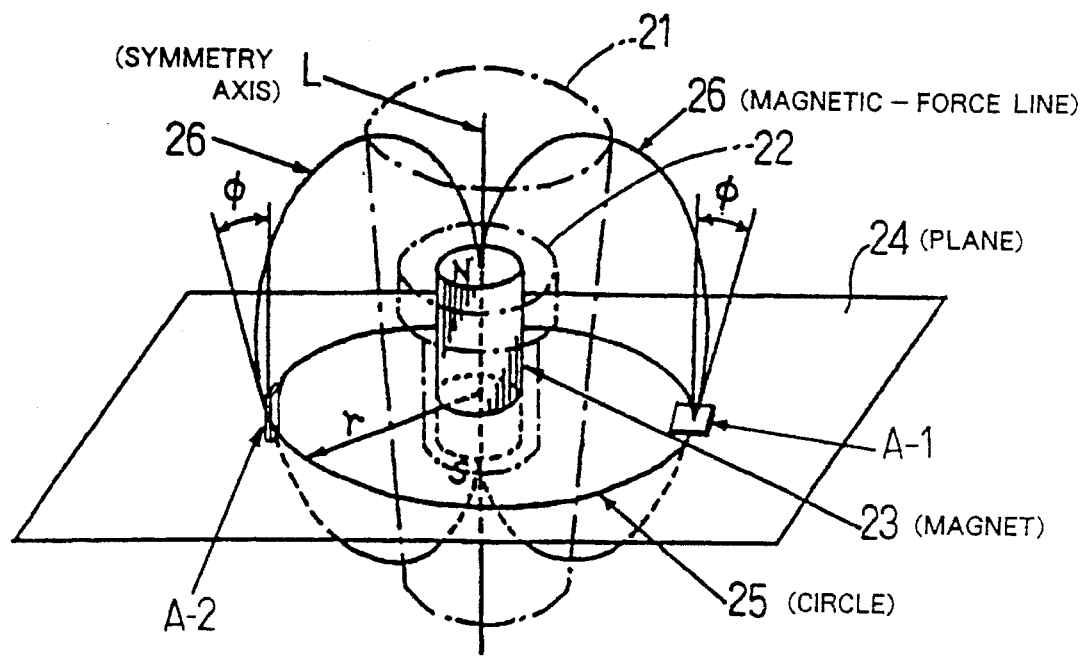
FIG. 1 is a view illustrating the principle of the present invention.
Figure 2:
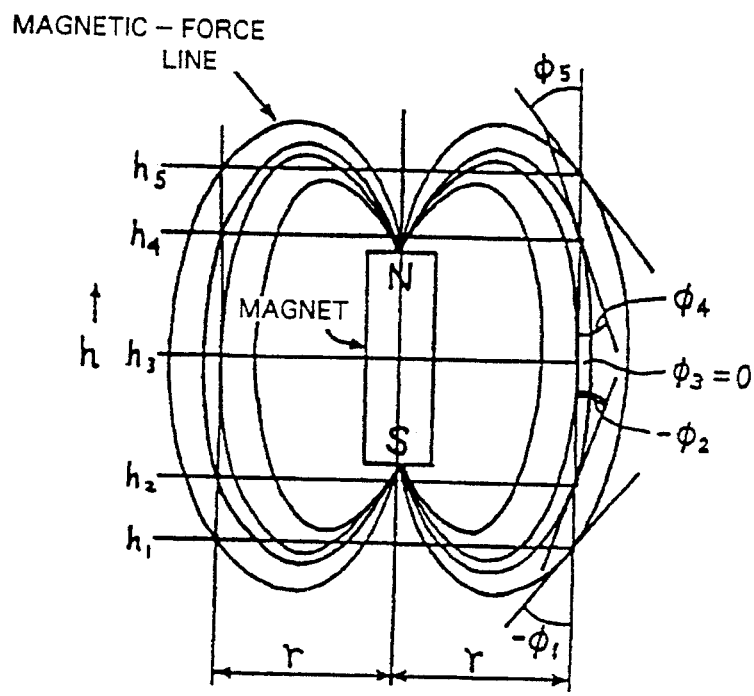
FIG. 2 is a distribution graph of the magnetic flux of the magnet in the float of an embodiment of the present invention.
Figure 3:
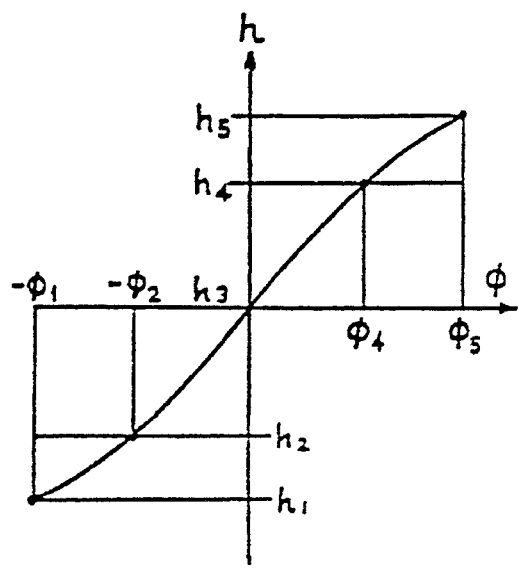
FIG. 3 is a view illustrating the relationship between the positions of the magnet and the tangential angles of the magnetic-force lines of the magnet in the embodiment of the present invention.

Hereinbelow, the present invention will be described in detail with reference to the accompanying drawings. FIGS. 1 to 3 show the principle of the present invention.

As shown in FIG. 1, in an embodiment of an area flow meter of the present invention, a float 22 is disposed inside a vertical flow passage pipe 21 so as to be vertically movable therein. A magnet 23, which is so magnetized as to have its north and south poles aligned in a vertical direction, is fixedly mounted in the float 22. The magnet 22 assumes a symmetrical form having a vertical symmetry axis L, which results in a symmetrical distribution of the magnetic flux density of the magnet 22 with respect to the symmetry axis.

Consequently, as shown in FIG. 1, on a circle 25 which consists of all points at a given distance from its center coinciding with the symmetry axis L in a horizontal plane 24 perpendicular to the symmetry axis L: magnetic flux densities B in planes perpendicular to magnetic-force lines 26 are the same in magnitude at any of the above-mentioned points; and, tangential angles $\phi$ (i.e., $-\phi_2$, $-\phi_1$, ..., $\phi_3$, $\phi_4$, , , ... , as shown in FIG. 2), each of which is an angle formed between each of the magnetic-force lines 26 and the symmetry axis L, are also the same in magnitude at any of the above-mentioned points.

Since the magnetic-force lines 26 of the magnet 23 substantially do not vary in geometry or arrangement thereof even when the magnetic force of the magnet 23 varies in magnitude to some extent, the tangential angle $\phi$ in each of the above-mentioned points on the common circle 25 shown in FIG. 1 substantially remains constant even when the magnetic force of the magnet 23 varies in magnitude to some extent under the influence of its environmental temperature variations. Consequently, it is possible to determine the tangential angle $\phi$ on the basis of a relative height h of the magnet 23 relative to the plane 24.

In other words, as shown in FIG. 2 which is a side view of the magnet 23 so magnetized as to have its north and south poles aligned in a vertical line, when the relative height h of the magnet 23 varies in a condition in which the circle 25 keeps its radius r constant, the tangential angle $\phi$ of the magnetic-force line 26 varies in a manner shown in FIG. 3 so as to correspond to the relative height h of the magnet 23. This phenomenon does not vary even when the float 22 rotates on its central axis, provided that the central axis is kept in a position coincident with the symmetry axis L of the magnet 23.

The radius r of the circle 25 is so determined as to dispose the circle 25 outside the flow passage pipe 21. A pair of magnetic sensors A-1, A-2 having the same properties are disposed on the circle 25. Each of the magnetic sensors A-1, A-2 is provided with magnetism-responsive surfaces, and issues an electrical signal corresponding to the magnetic flux density detected in the magnetism-responsive surfaces. Typical ones of the magnetic sensors A-1, A-2 are Hall devices and like magnetism-responsive devices. In the embodiment of the area flow meter of the present invention, the Hall devices are used as the magnetic sensors A-1, A-2.

Of the magnetic sensors or Hall devices A-1, A-2, one A-1 has its magnetism-responsive surfaces disposed perpendicularly to the symmetry axis L of the magnet 23, while the other A-2 has its magnetism-responsive surfaces disposed parallel to the symmetry axis L. The Hall devices A-1 and A-2 are provided with signal-converter circuits to issue with the same gain K their output signals $E_1$ and $E_2$, respectively. These output signals $E_1$, $E_2$ correspond to the magnetic flux densities detected in the magnetism-responsive surfaces of the Hall devices A-1, A-2. In other words, the output signals $E_1$, $E_2$ can be represented by the following equations:

$$E_1 = K \times B_1, \quad E_2 = K \times B_2$$

where: $B_1$ is the magnetic flux density detected in the magnetism-responsive surfaces of the Hall device A-1; and, $B_2$ is the magnetic flux density detected in the magnetism-responsive surfaces of the Hall device A-2.

As already described above, since the tangential angle $\phi$, which is formed between the magnetic-force line and the symmetry axis at each of all the points on the circle 25, and, the magnetic flux density B in each of the planes perpendicular to the magnetic-force lines are constant in magnitude at any of the points on the circle 25, each of the output signals $E_1$, $E_2$ is determined on the basis of an angle formed between each of the magnetism-responsive surfaces of the Hall devices and each of the magnetic-force lines. Consequently, the output signals $E_1$, $E_2$ can be represented by the following equations:

$$E_1 = K \times B_1 = K \times \cos \phi$$

$$E_2 = K \times B_2 = K \times \sin \phi$$

where: K is a constant.

Combining these equations and eliminating both the magnetic flux density B and the constant K gives the following equations (1) and (2):

$$E_2/E_1 = \tan \phi \quad (1)$$

$$\phi = \tan^{-1}(E_2/E_1) \quad (2)$$

The equation (2) clarifies that the tangential angle $\phi$ of the magnetic-force lines is derived from only the output signals $E_1$, $E_2$ of the two sensors A-1, A-2 without using the magnetic flux density B, and, therefore clarifies that the relative position h of the magnet 23 relative to the plane 24 in which the sensors A-1, A-2 are provided is determined on the basis of the output signals $E_1$, $E_2$ of the two sensors A-1, A-2 without using the magnetic flux density B.

As is clear from FIG. 2, in operation, the relative position h of the magnet 23 varies over several centimeters in the embodiment of the area flowmeter of the present invention. Consequently, the magnetic flux density B in positions in which the sensors A-1, A-2 are disposed varies appreciably as the relative position or height h of the magnet 23 varies. However, according to the present invention, it is possible to determine the tangential angles $\phi$ of the magnetic-force lines with high accuracy as is clear from the above equation (2), which makes the present invention applicable to the area flow meter.

Incidentally, the relationships between the tangential angles $\phi$ of the magnetic-force lines 26 (i.e., $\tan \phi$) and the relative positions h of the magnet 23 can be previously determined on the basis of the specifications of the magnet 23 and the installation positions of the sensors A-1, A-2 on the circle 25 (the radius of which is r) through calculations and experiments, and, therefore are known.

Consequently, in the area flow meter of the embodiment of the present invention, it is possible to determine the tangential angles $\phi$ by the use of the output signals $E_1$, $E_2$ issued from the sensors A-1, A-2 through the calculations of the equations (1), (2), and, therefore to determine the relative position or height h of the magnet 23 relative to the plane 24.

Signal processing of the output signals $E_1$, $E_2$ and the calculations of the equations (1), (2) can be easily performed by the use of analog/digital converters and microprocessors which may easily perform linearization processings of the output signals $E_1$, $E_2$ of the sensors A-1, A-2 to eliminate the necessity of having these output signals $E_1$, $E_2$ be proportional to the magnetic flux densities B.

Further, in the area flow meter of the present invention, the relationship between the relative position or height h of the magnet 23 in the float 22 and the flow rates of the fluid being measured is generally non-linear, and varies according to the specifications of the fluid being measured, which requires complex calculations to determine the flow rate of the fluid on the basis of the relative position of height h of the magnet 23 of the float 22. However, these complex calculations may be performed by the above-mentioned microprocessors, which may considerably reduce the manufacturing cost of the area flow meter of the present invention.

Figure 4:
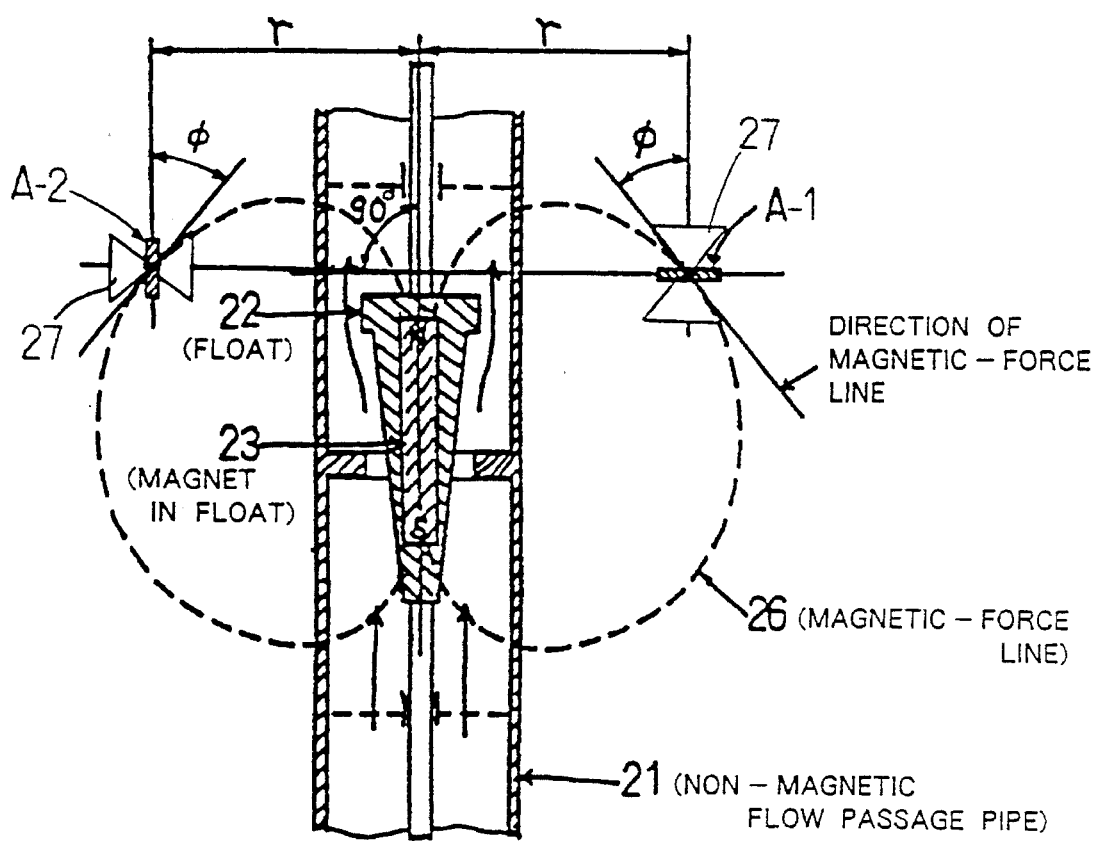
FIG. 4 is an overall schematic view of the embodiment of the present invention.

FIG. 4 shows the embodiment of the area flow meter using the magnetic sensors or Hall devices A-1, A-2 of the present invention.

Figure 5:
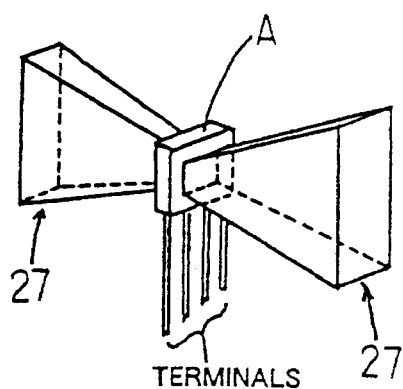
FIG. 5(a) is a perspective view of an example of the magnetic sensor used in the embodiment of the present invention.
FIG. 5(b) is a perspective view of another example of the magnetic sensor used in the embodiment of the present invention.
Figure 5:
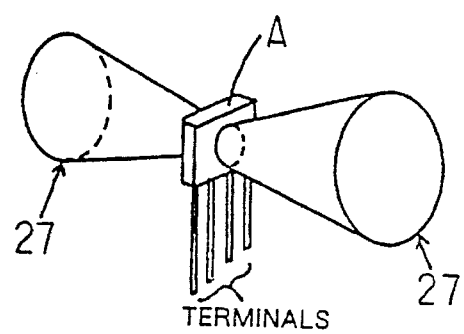
Figure 6:
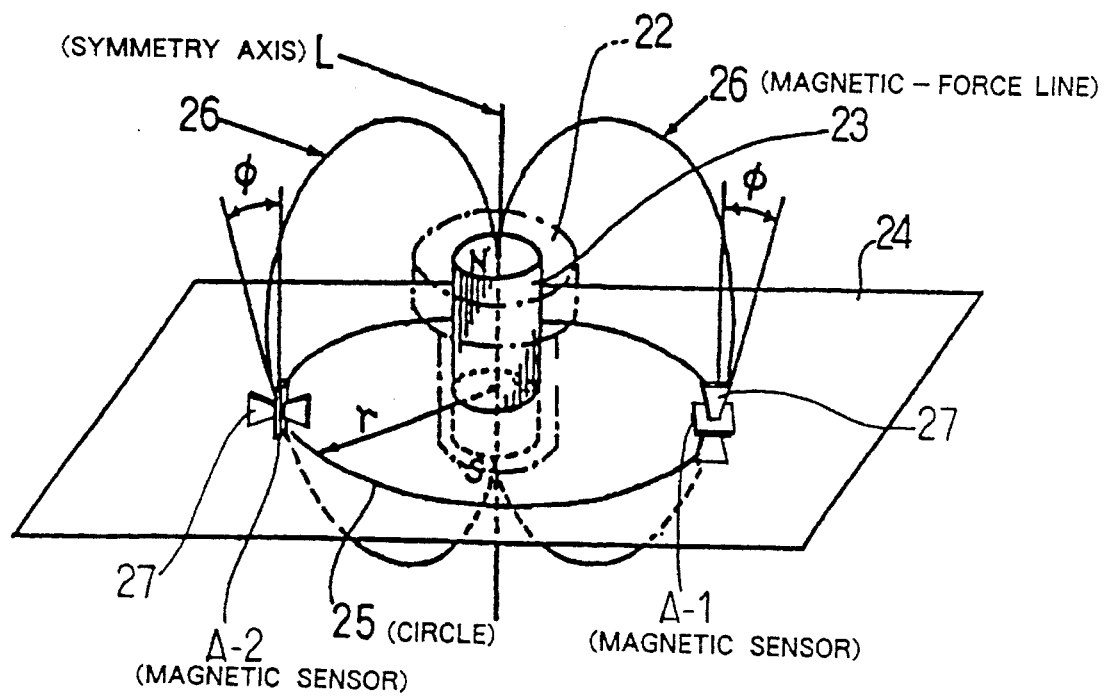
FIG. 6 is a perspective view of the embodiment of the present invention, illustrating its essential construction.

In the embodiment of the present invention, as shown in FIG. 4, each of the magnetic sensors such as the Hall devices A-1, A-2 is provided with magnetism-responsive surfaces in its opposite sides. Fixedly mounted on each of the magnetism-responsive surfaces of the Hall devices A-1, A-2 is a fixed end of a magnetism-gathering tapered element 27 made of high-permeability material such as permalloys and the like. As shown in FIGS. 5(a) and 5(b), the tapered element 27 is flared outwardly from the fixed end thereof to its free end.

In the Hall devices A-1, A-2 of the embodiment of the present invention, the magnetic flux of the magnet 23 in the float 22 is gathered by the magnetism-gathering tapered elements 27, and condensed in the fixed ends of the elements 27 to increase in density.

Consequently, the magnetic flux thus condensed in density in the magnetism-responsive surfaces of the Hall devices A-1, A-2 increases the output signals of the Hall devices A-1, A-2 in magnitude so that the apparent output sensitivities of the Hall devices A-1, A-2 increase.

In each of the Hall devices A-1, A-2, since the magnetic flux density detected by each of the Hall devices A-1, A-2 itself is amplified, there is no fear that other electrical physical quantities such as noises and like obstacles are amplified, which makes it possible to obtain the intense electrical signals $E_1$, $E_2$ substantially free from any noises or electrical physical obstacles.

As described above, the present invention has succeeded in increasing the apparent output sensitivities of the Hall devices A-1, A-2 by gathering the magnetic flux of the magnet 23 in the magnetism-responsive surfaces of the Hall devices A-1, A-2 by the use of the magnetism-gathering tapered elements 27 being substantially equal to each other in magnetism-gathering capacity:

(1) each of which tapered elements 27 flares outwardly from its fixed end to its free end;

(2) a pair of which elements 27 have their fixed end fixedly mounted on the magnetism-responsive surfaces of each of the Hall devices A-1, A-2 so that the pair of the elements 27 are symmetrical with respect to each of the Hall devices A-1, A-2; and (3) each of which magnetism-gathering tapered elements 27 is made of high-permeability material such as permalloys and the like.

Figure 7:
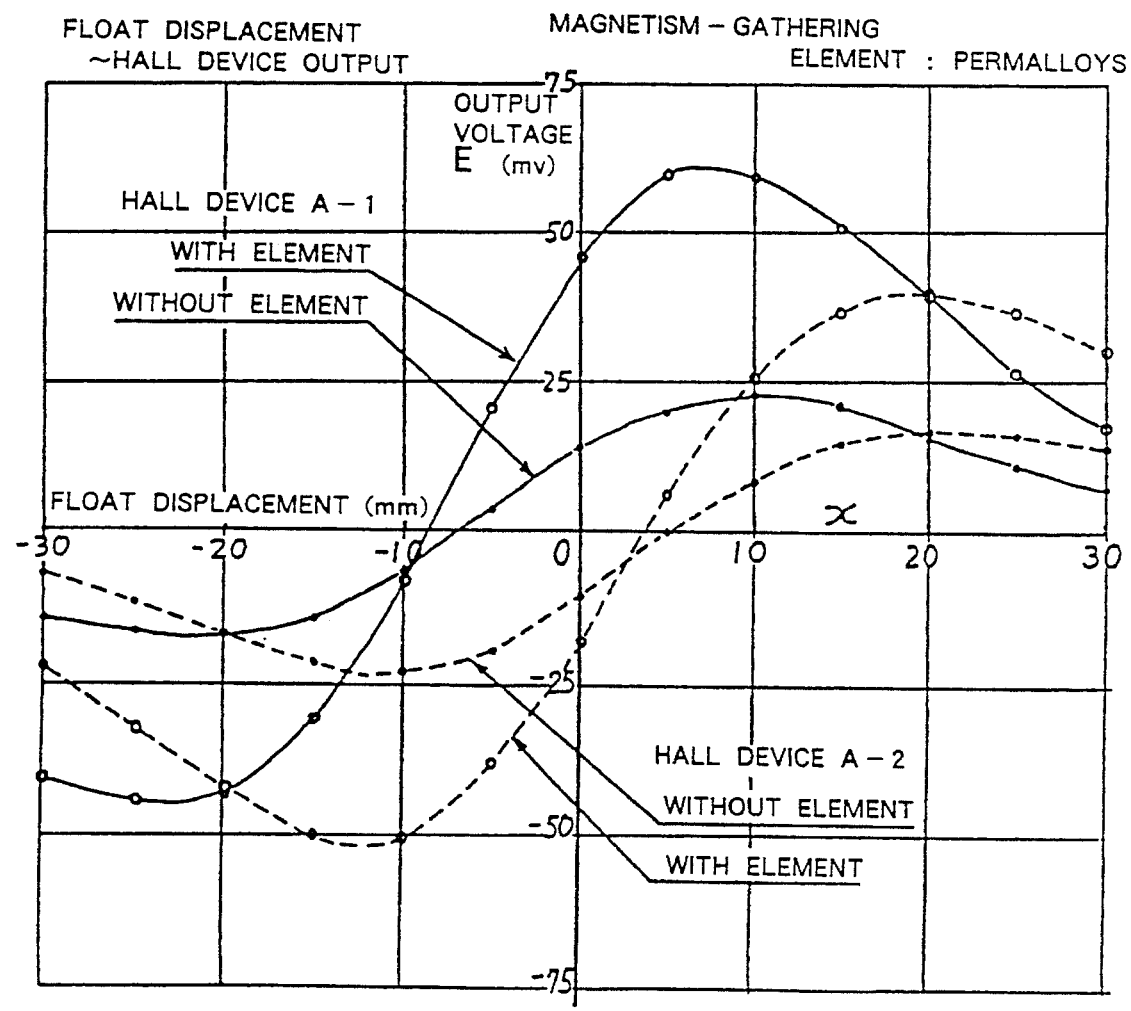
FIG. 7 is a graph illustrating an example of experimantal data of the magnetic sensors used in the embodiment of the present invention.
Figure 8:
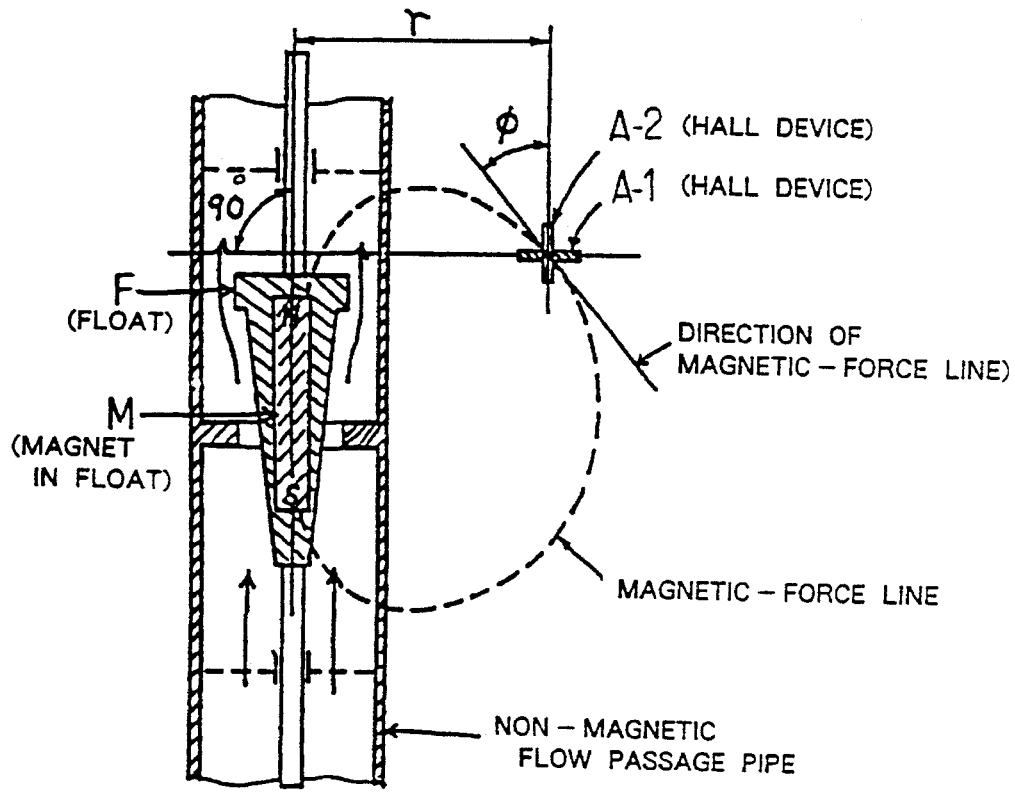
FIG. 8 is an overall schematic view of the conventional area flow meter, illustrating the means for converting a value of the height of the float into an electrical signal.
Figure 9:
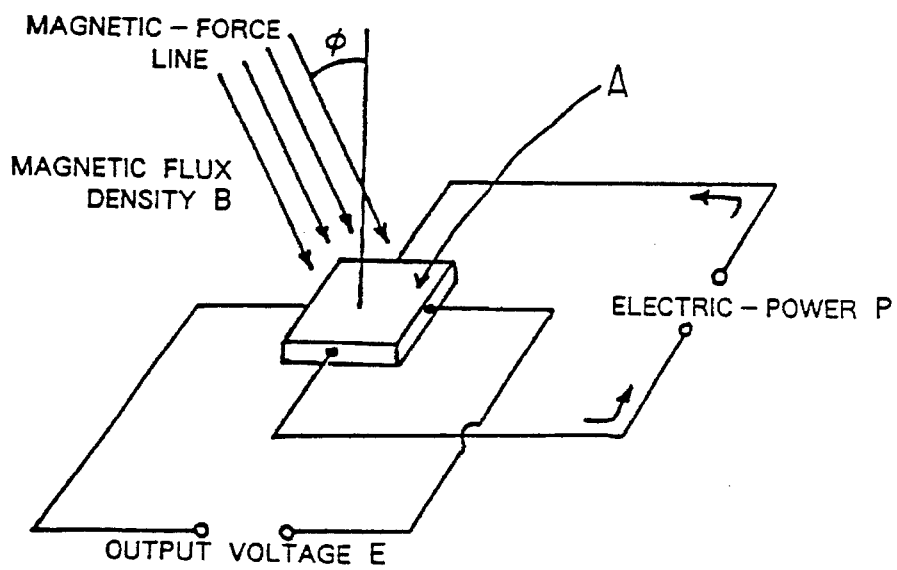
FIG. 9 is a perspective view of an example of the conventional magnetic sensor.

FIG. 7 shows a graph of the experimental data of the the embodiment of the present invention, illustrating the effects of the embodiment of the present invention. In the graph shown in FIG. 7, the relationship between: the output voltages of a pair of the Hall devices A-1, A-2 used in the area flow meter shown in FIG. 4; and, the vertical displacement of the float 22 is illustrated to compare the case of using the magnetism-gathering elements 27 with the case of not using these elements 27. The graph shown in FIG. 7 clarifies that the apparent output sensitivities of the Hall devices A-1, A-2 with the magnetism-gathering elements 27 are approximately 2.5 times as much as those of the Hall devices A-1, A-2 without these elements 27.

In the above embodiment of the present invention, the Hall devices are used as the magnetic sensors. However, it is also possible to use any other magnetic sensors such as magnetic-resistance devices and like devices in the present invention, and obtain the same effects by using these sensors or devices.

What is claimed is:

1. In an area flow meter comprising:

a vertical flow passage pipe through which a fluid being measured flows upward; and a float made of a material larger in specific gravity than said fluid, said float being mounted in said flow passage pipe so as to be vertically movable in said flow passage pipe, an effective cross-sectional area of which varies when said float is vertically moved by said fluid;

the improvement wherein:

the area flow meter further comprises a magnet (23) and a pair of Hall devices;

said magnet is mounted in said float, and is so magnetized as to have its north and south poles aligned vertically, whereby said magnet produces magnetic-force lines symmetrically with respect to a vertical symmetry axis thereof which is parallel to a direction in which said float moves; and each of said pair of Hall devices is provided with a magnetism-responsive surface, is at the same distance from said symmetry axis of said magnet, and is disposed outside said flow passage pipe on a plane perpendicular to said symmetry axis of said magnet so that one of said Hall devices has said magnetism-responsive surface thereof arranged horizontally while the other of said Hall devices has said magnetism-responsive surface thereof arranged vertically.

2. The area flow meter as set forth in claim 1, wherein:

each of said Hall devices is provided with a magnetism-gathering tapered element in said magnetism-responsive surface thereof, said magnetism-gathering tapered element being made of a high-permeability material and so configured as to flare outwardly from a fixed end thereof to a free end thereof.

3. The area flow meter as set forth in claim 2, wherein:

said magnetism-gathering tapered element is made of Permalloy.

* * * * *